(No Model.)

H. D. STREATOR.
FISHING TACKLE HOLDER.

No. 599,370. Patented Feb. 22, 1898.

Witnesses:
Watter S. Wood
Dorr E. Wood

Inventor,
Henry D. Streator
By Fred L. Chappell
Att'y.

UNITED STATES PATENT OFFICE.

HENRY D. STREATOR, OF KALAMAZOO, MICHIGAN.

FISHING-TACKLE HOLDER.

SPECIFICATION forming part of Letters Patent No. 599,370, dated February 22, 1898.

Application filed October 2, 1894. Serial No. 524,716. (No model.)

*To all whom it may concern:*

Be it known that I, HENRY D. STREATOR, a citizen of the United States, residing in the city of Kalamazoo, in the county of Kalamazoo and State of Michigan, have invented certain new and useful Improvements in Fishing-Tackle Packages, of which the following is a specification.

My invention relates to improvements in devices for packing fishing-tackle, such as spoon-hooks and trolling apparatus of any description.

The principal object of my invention is to form a package which will afford perfect protection for the hook and will secure the line in a neat and convenient manner, to form the whole into a package which may be easily carried in the pocket of the sportsman without any danger of the same becoming entangled.

Another object is to form such an apparatus in an economical and convenient manner.

I accomplish these objects of my invention by the devices shown in the accompanying drawings, in which—

Figure 1:
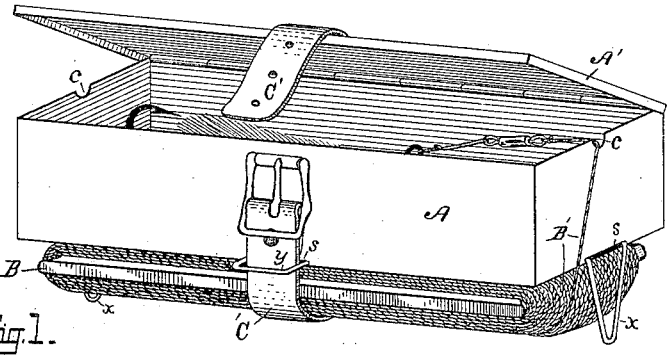
Figure 2:
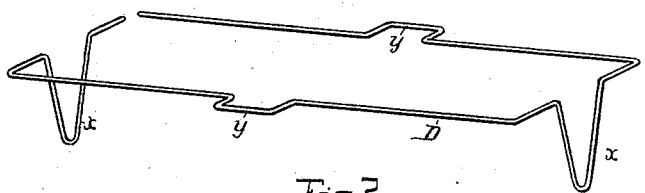
Figure 3:
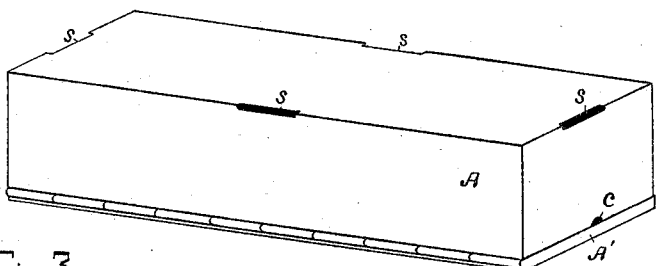
Figure 4:
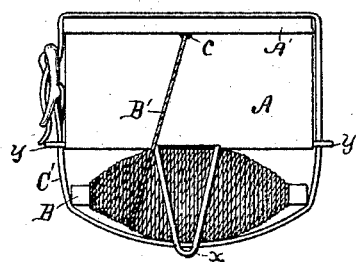

Figure 1 is a perspective view of my improved package complete, the cover of the box being open. Fig. 2 shows one of the lettered details of my improved package. Fig. 3 is a perspective detail view of the box alone, inverted. Fig. 4 is an end view of the box closed.

Similar letters of reference refer to similar parts throughout the several views.

In the drawings, A represents the body of the box.

A' is the cover.

B represents the block upon which the line is wound, and B' the line wound around the block.

I have shown my invention specially adapted for use with a box having a hinged cover. This is the cheapest construction. The box shown has an ordinary hinged cover opening on one side and has elongated holes $s$ $s$ $s$ $s$ punched in the angles at the middle of the sides and ends of the box. A notch $c$ is in each end of the box. A wire D is then bent in the form indicated in Fig. 2, the general outline of the same being the outline of the bottom of the box, with loops $y$ $y$ projecting through the sides of the box, as seen in Fig. 1, and loops $x$ projecting down at each end of the box, as seen in Fig. 4. Through the loops $y$, around the box, a strap C' is inserted, the loops being narrow in form to retain the strap in position by friction. The hook is placed in the box, the line is passed out through the notch $c$ and wound upon the block, is slipped in between the projecting loops $x$ $x$ to each end, when the strap C' is buckled tight around both the line and box, holding the whole together in a very close package.

In the bottom of the box C is a layer of felt for absorbing readily any moisture that may be on the hook, keeping the hook dry to prevent rusting or destruction of any of the parts of the same or destruction of the line inside, the moisture being absorbed, the felt accomplishing the result perfectly. It is not deemed necessary to illustrate the felt, as there is nothing new about the fastening of the same.

My package is capable of considerable variation without departing from my invention.

Having thus described my invention, what I claim as new, and desire to secure by Letters Patent, is—

1. The combination of a box A, with notch $c$, therein for the passage of the line and slots $s$, through the bottom; a wire frame D, fitted to the bottom of the box with loops $x$, $x$, projecting out of the ends of the box and downwardly therefrom and loops $y$, $y$, projecting to the side to receive the strap; the cover A', to the box and a strap C', around the box extending through the loops $y$, $y$, for retaining the fishing-line upon its block and storing a hook within the box as specified.

2. The combination of the box containing a notch in the end thereof for passing of the fish-line; loops projecting from the sides of said box; a strap for insertion through said loops; laterally-projecting loops at the ends of the box; all to serve as a means for storing the fish-hook within the box and for retaining a line and block on the outside thereof for the purpose specified.

In witness whereof I have hereunto set my hand and seal in the presence of two witnesses.

HENRY D. STREATOR. [L. S.]

Witnesses:
MARIAN I. LONGYEAR,
WALTER S. WOOD.